United States Patent
Finlay (10) Patent No.: US 10,246,193 B1
(45) Date of Patent: Apr. 2, 2019

(54) PASSENGER SEAT WITH ARTICULATED PNEUMATIC SEAT CUSHION

(71) Applicant: B/E Aerospace, Inc., Winston-Salem, NC (US)

(72) Inventor: Travis K. Finlay, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/891,896

(22) Filed: Feb. 8, 2018

(51) Int. Cl.
*A47C 7/14* (2006.01)
*B64D 11/06* (2006.01)
*B60N 2/90* (2018.01)

(52) U.S. Cl.
CPC .......... *B64D 11/0647* (2014.12); *B60N 2/914* (2018.02); *B64D 11/064* (2014.12)

(58) Field of Classification Search
CPC .... B64D 11/0647; B64D 11/064; B60N 2/914
USPC .............. 297/284.11, 219.1, 228.13, 452.41
See application file for complete search history.

(56) References Cited

U.S. PATENT DOCUMENTS

| | | | | |
|---|---|---|---|---|
| 3,983,640 A * | 10/1976 | Cardullo | ............... | G09B 9/10 434/59 |
| 5,366,272 A * | 11/1994 | Lebrun | ............... | B60N 2/62 297/284.11 |
| 5,419,614 A * | 5/1995 | Richards | ............... | B60N 2/62 297/284.11 |
| 5,607,204 A * | 3/1997 | Gryp | ............... | B60N 2/0715 297/284.11 |
| 5,881,407 A * | 3/1999 | Chu Pt | ............... | A61G 5/1043 297/452.41 |
| 6,010,195 A * | 1/2000 | Masters | ............... | B60N 2/0232 297/284.11 X |
| 6,036,266 A * | 3/2000 | Massara | ............... | B60N 2/10 297/328 |
| 6,088,643 A * | 7/2000 | Long | ............... | A47C 4/54 701/49 |
| 6,106,063 A * | 8/2000 | Dauphin | ............... | A47C 1/023 297/284.11 X |
| 6,386,633 B1 * | 5/2002 | Newton | ............... | B60N 2/62 297/284.11 X |

(Continued)

FOREIGN PATENT DOCUMENTS

EP 0 639 479 A1 8/1994

*Primary Examiner* — Rodney B White
(74) *Attorney, Agent, or Firm* — Clements Bernard Walker PLLC (57) ABSTRACT

An aircraft passenger seat that includes a seat frame including a seat back and at least one armrest, a seat bottom that includes a seat pan and a foam seat cushion positioned on the seat bottom above the seat pan, a pneumatic cushion positioned on the seat bottom between the seat pan and the foam seat cushion and adapted to maintain a predetermined level of inflation determined by air pressure within the pneumatic cushion, and a pneumatic inflation device communicating with the pneumatic cushion for permitting the air pressure within the pneumatic cushion to be varied as desired to provide additional comfort to the seat occupant. The pneumatic cushion may include at least first and second laterally-separated cushion chambers providing lateral articulation of the first and second cushion chambers relative to each other.

18 Claims, 7 Drawing Sheets

(56) References Cited

U.S. PATENT DOCUMENTS

| | | | | |
|---|---|---|---|---|
| 6,402,244 B1 | * | 6/2002 | Schonenberg | B60N 2/22 297/284.11 |
| 6,402,245 B1 | * | 6/2002 | Newton | B60N 2/62 297/284.11 |
| 6,419,317 B1 | * | 7/2002 | Westrich | B60N 2/0284 297/284.11 |
| 6,682,141 B2 | * | 1/2004 | Reynolds | B60N 2/42763 296/68.1 |
| 6,736,084 B2 | * | 5/2004 | McDonough | B63B 29/04 114/347 |
| 6,752,454 B2 | * | 6/2004 | Ruel | B60R 21/207 297/284.11 X |
| 6,935,684 B2 | * | 8/2005 | Sakai | B60N 2/4221 297/216.1 |
| 7,063,386 B2 | | 6/2006 | Dowty et al. | |
| 7,527,333 B2 | * | 5/2009 | Suzuki | B60N 2/42718 280/728.2 |
| 7,669,928 B2 | * | 3/2010 | Snyder | B60N 2/0232 297/284.11 X |
| 7,717,520 B2 | * | 5/2010 | Boren | B64D 11/06 297/216.1 |
| 7,784,866 B2 | * | 8/2010 | Yoshikawa | B60R 21/207 280/730.1 |
| 7,878,589 B2 | * | 2/2011 | Murakami | B60N 2/42763 297/284.11 X |
| 8,128,167 B2 | * | 3/2012 | Zhong | B60N 2/62 297/284.11 |
| 8,272,687 B2 | * | 9/2012 | Gross | B60N 2/4221 297/284.11 X |
| 8,297,697 B2 | * | 10/2012 | Gross | B60N 2/4221 297/284.11 X |
| 8,393,681 B2 | * | 3/2013 | Gross | B60N 2/42763 297/284.11 X |
| 8,696,065 B2 | | 4/2014 | Udriste et al. | |
| 8,702,121 B2 | * | 4/2014 | Yamashita | B60N 2/42718 280/730.1 |
| 8,888,126 B2 | * | 11/2014 | Nukaya | B60N 2/42718 280/730.1 |
| 9,033,364 B2 | * | 5/2015 | Nukaya | B60R 21/201 280/728.1 |
| 9,321,373 B2 | * | 4/2016 | Sakata | B60N 2/995 |
| 9,527,417 B2 | * | 12/2016 | Dry | B60N 2/525 |
| 9,610,872 B2 | * | 4/2017 | Dry | B60N 2/4415 |
| 9,731,638 B2 | * | 8/2017 | Benson | B60N 2/914 |
| 9,738,187 B1 | * | 8/2017 | McCoy | B60N 2/4279 |
| 9,809,132 B2 | * | 11/2017 | Bortolon | B60N 2/62 |
| 9,896,007 B2 | * | 2/2018 | Ohno | B60N 2/90 |
| 9,956,897 B2 | * | 5/2018 | Gagnier | B60N 2/58 |
| 9,981,582 B2 | * | 5/2018 | Line | B29C 43/18 |
| 9,981,588 B2 | * | 5/2018 | Dry | B60N 2/20 |
| 9,994,138 B2 | * | 6/2018 | Whitens | B60N 2/42763 |
| 10,045,623 B2 | * | 8/2018 | Bortolon | B60N 2/62 |
| 10,046,671 B2 | * | 8/2018 | Seiller | B60N 2/0248 |
| 10,059,239 B2 | * | 8/2018 | Jaranson | B60N 2/914 |
| 2006/0162081 A1 | | 7/2006 | Kerekes | |
| 2008/0157578 A1 | | 7/2008 | Snyder | |
| 2009/0200848 A1 | * | 8/2009 | Kubler | B60N 2/0232 297/284.11 |

\* cited by examiner

PASSENGER SEAT WITH ARTICULATED PNEUMATIC SEAT CUSHION

BACKGROUND

The invention disclosed and claimed in this application relates to an articulated pneumatic seat cushion intended for use in a passenger seat, such as an aircraft passenger seat. Aircraft passenger seats, particularly ones found in the main cabin, typically have a metal seat bottom base, or "seat pan", on top of which is positioned a foam cushion. These foam cushions have a fixed firmness, shape and size, and therefore must be intended for a "standard" size passenger. Some seat occupants are shorter, taller, heavier or lighter than the standard passenger and therefore must accommodate themselves to a less than ideal comfort level during travel. In addition, some passengers prefer a softer, more compressible seat than provided by typical main cabin seat, or prefer to have more support under the upper leg, or prefer a more raised leg position that better accommodates an articulated recline seating position.

The invention in one aspect is for an aircraft passenger seat that permits a range of adjustment of the shape, size, compressibility and articulation of the seat bottom cushion. As described in this application, the invention is disclosed with regard to an aircraft passenger seat bottom, but also has potential application in seat backs, leg rests and ottomans of seats in main cabin, business and first class seating.

SUMMARY

In one aspect, embodiments of the inventive concepts disclosed are directed to a passenger seat bottom that includes an articulated pneumatic cushion.

In a further aspect, a passenger seat bottom is provided that includes an articulated pneumatic cushion that includes an adjustment feature that allows the cushion to be inflated or deflated by the seat occupant in order to achieve a more comfortable seating position.

In a further aspect, a passenger seat bottom is provided that includes an articulated pneumatic cushion that includes an adjustment feature that allows the cushion to be inflated or deflated by interconnection with an aircraft pneumatic system that is enabled to adjust the amount of air in the cushion based on the aircraft cabin atmospheric pressure.

These and other aspects of the invention are achieved by providing a passenger seat that includes a seat base for attaching the seat to an aircraft deck, a seat frame mounted on the seat base, and a seat bottom that includes a seat pan and a foam seat cushion positioned on the seat bottom above the seat pan. A pneumatic cushion is positioned on the seat bottom between the seat pan and the foam seat cushion, and includes an inflation device that permits the air pressure within the pneumatic cushion to be varied as desired to provide additional comfort to the seat occupant.

In accordance with another aspect of the invention, the pneumatic cushion includes at least first and second laterally-separated chambers providing lateral articulation of the first and second chambers relative to each other.

In accordance with another aspect of the invention, the inflation device includes a manual hand pump operable by the seat occupant.

In accordance with another aspect of the invention, the aircraft seat includes a seat frame including a seat back and at least one armrest and a seat bottom that includes a seat pan and a foam seat cushion positioned on the seat bottom above the seat pan. A pneumatic cushion is positioned on the seat bottom between the seat pan and the foam seat cushion and is adapted to maintain a predetermined level of inflation determined by air pressure within the pneumatic cushion. A pneumatic inflation device communicating with the pneumatic cushion is provided for permitting the air pressure within the pneumatic cushion to be varied as desired to provide additional comfort to the seat occupant.

In accordance with another aspect of the invention, the pneumatic cushion includes at least first and second laterally-separated cushion chambers providing lateral articulation of the first and second cushion chambers relative to each other.

In accordance with another aspect of the invention, the inflation device includes a manual hand pump operable by the seat occupant to control the air pressure within the pneumatic cushion.

In accordance with another aspect of the invention, the inflation device includes a pneumatic pump adapted for connection to an aircraft cabin altitude controller for controlling the air pressure within the pneumatic cushion.

In accordance with another aspect of the invention, a mechanical attachment is carried by the seat pan for securing the pneumatic cushion to the seat pan.

In accordance with another aspect of the invention, a mechanical attachment is carried by the foam cushion for securing the pneumatic cushion to the foam cushion.

In accordance with another aspect of the invention, a mechanical attachment is carried by the seat pan for securing the pneumatic cushion to the seat pan and a mechanical attachment is carried by the foam cushion for securing the pneumatic cushion to the foam cushion.

In accordance with another aspect of the invention, a mechanical attachment is carried by the foam cushion for securing the pneumatic cushion to the foam cushion.

In accordance with another aspect of the invention, a mechanical attachment is carried by the seat pan for securing the pneumatic cushion to the seat pan and a mechanical attachment carried by the foam cushion for securing the pneumatic cushion to the foam cushion.

In accordance with another aspect of the invention, a first pair of complimentary touch fastener elements is carried by the foam cushion and pneumatic cushion, respectively, for securing the foam cushion to the pneumatic cushion, and a second pair of complimentary touch fastener elements is carried by the seat pan and the pneumatic cushion, respectively, for securing the pneumatic cushion to the seat pan.

In accordance with another aspect of the invention, the touch fasteners are complimentary hook and loop elements.

In accordance with another aspect of the invention, the pneumatic cushion a has a shape that has a forward end with a greater height dimension than a rearward end of the pneumatic cushion and is adapted to elevate a seat occupant's upper leg in relation to the seat occupant's thigh.

In accordance with another aspect of the invention, in side elevation the pneumatic cushion defines an elongate triangle having a base positioned at a forward end of the seat pan.

In accordance with another aspect of the invention, an aircraft passenger seat is provided that includes a seat base for being attached to a deck of the aircraft and a seat frame carried by the seat base and including a seat back and at least one armrest. A seat bottom is carried by the seat frame that includes a seat pan and a foam seat cushion positioned on the seat bottom above the seat pan. A pneumatic cushion is positioned on the seat bottom between the seat pan and the foam seat cushion and is adapted to maintain a predetermined level of inflation determined by air pressure within the pneumatic cushion. A pneumatic inflation device communicates with the pneumatic cushion for permitting the air pressure within the pneumatic cushion to be varied as desired to provide additional comfort to the seat occupant. A rearward end of the pneumatic cushion is adapted to elevate a seat occupant's upper leg in relation to the seat occupant's thigh.

Embodiments of the inventive concepts can include one or more or any combination of the above aspects, features and configurations.

BRIEF DESCRIPTION OF THE DRAWINGS

Implementations of the disclosed inventive concepts are better understood when consideration is given to the following detailed description. The description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described with reference to the accompanying drawings in which exemplary embodiments are shown. However, the inventive concepts may be embodied in many different forms and should not be construed as limited to the representative embodiments of this application.

Figure 1:
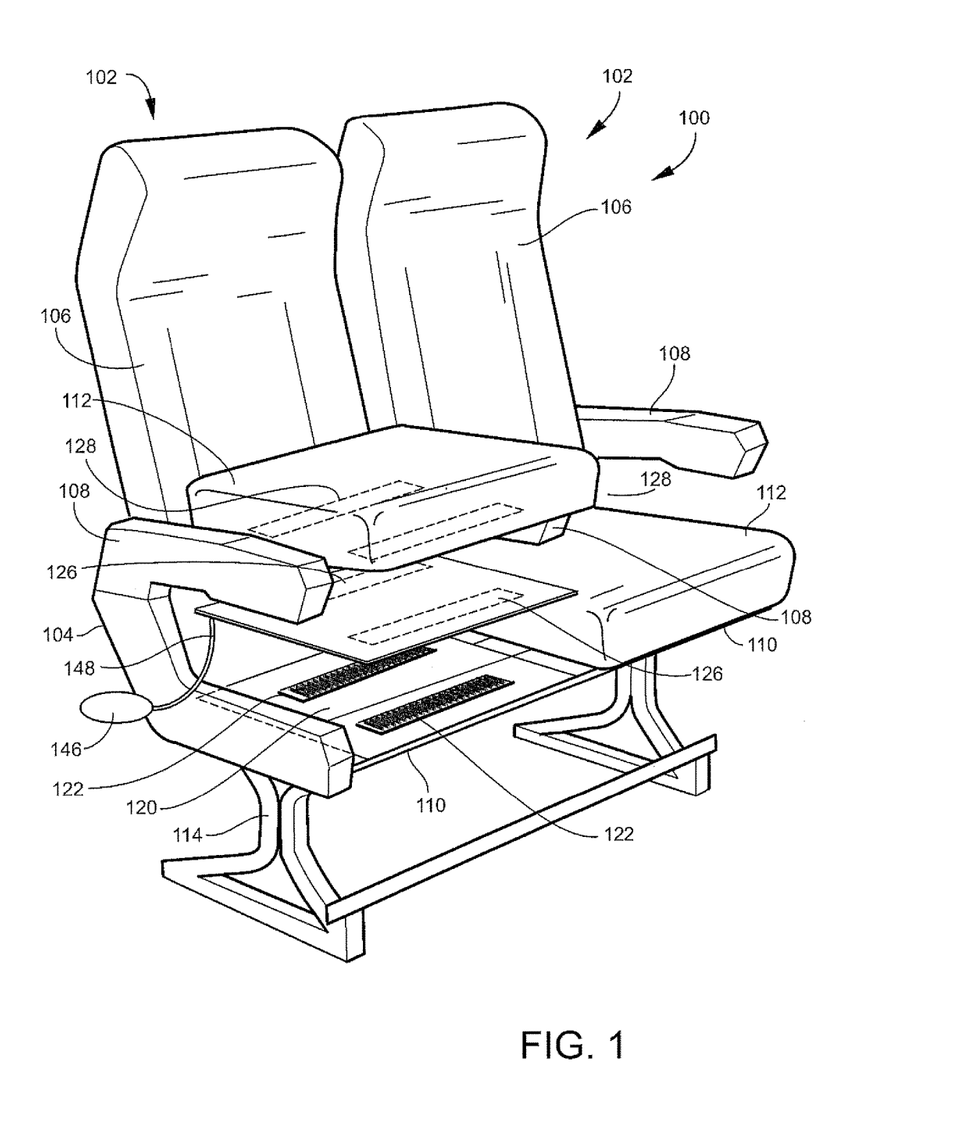
FIG. 1 is a partially exploded perspective view of a pair of main cabin seats equipped with a pneumatic cushion in accordance with one embodiment of the invention.

In an exemplary embodiment, FIG. 1 shows a grouping 100 of aircraft passenger seats 102 positioned on a frame 104 and each of which include a cushioned seat back 106, arm rests 108, and rigid seat pans 110 which provide a firm base on which to support the weight of the seat occupant. Foam seat cushions 112 are provided for being positioned above the seat pans 110 and provide a direct cushioned seating surface for the seat occupants of the seats 102. The frame 104 and other components of the seat are carried on a base 114 mounted to an aircraft deck by suitable track fittings, not shown.

Each seat 102 includes a pneumatic cushion 120 (one only shown in FIG. 1) that is positioned on the top surface of the seat pan 110 and directly under the foam cushion 112. As shown in further detail in other drawings, the pneumatic cushion 120 is held in place by mechanical attachments, for example, touch fasteners such as hook and loop fastener elements 122 positioned on the seat pan 110 and mating with loop fastener elements 124 positioned on the bottom surface of the pneumatic cushion 120. See FIGS. 2, 3 and 4. The pneumatic cushion 120 also includes touch fasteners such as hook and loop fastener elements 126 positioned on its top surface and mating with loop fastener elements 128. Other fasteners may be used, and the touch fasteners may be the hook and loop type as described, or other types such as mushroom, Christmas tree or other suitable types.

Figure 2:
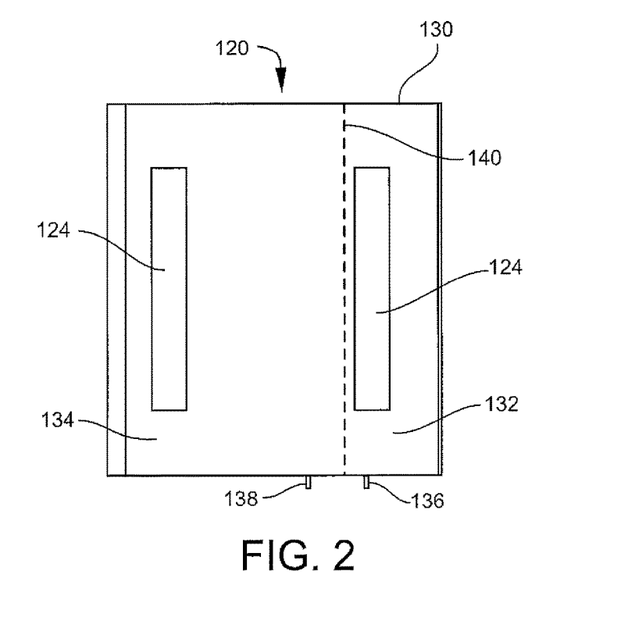
FIG. 2 is a top plan view of an articulated pneumatic cushion according to one aspect of the invention.
Figure 3:
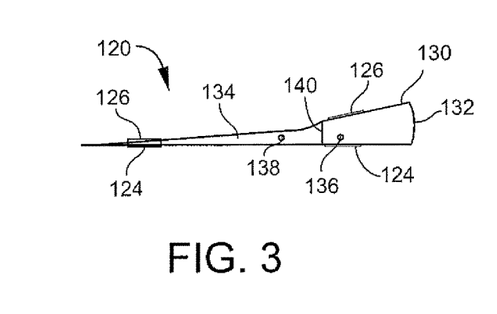
FIG. 3 is a side elevation view of the articulated pneumatic cushion of FIG. 2 according to one aspect of the invention.
Figure 4:
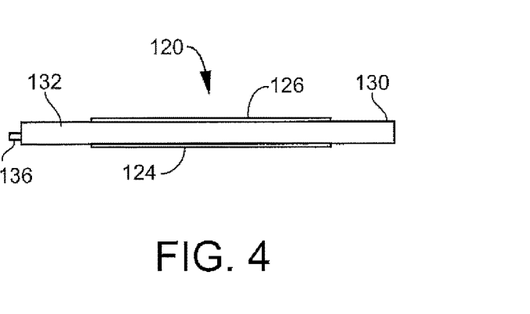
FIG. 4 is a front elevation view of the articulated pneumatic cushion of FIG. 2 according to one aspect of the invention.
Figure 5:
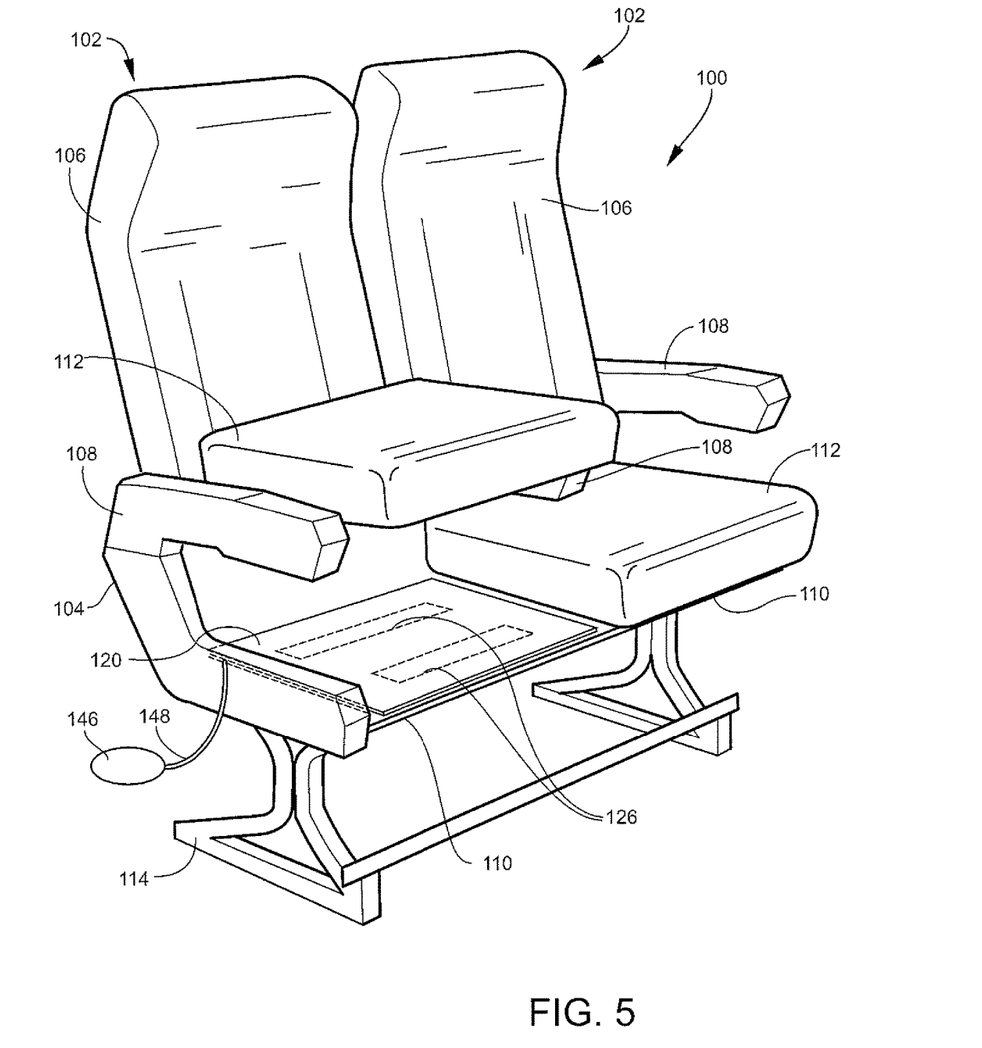
FIG. 5 is a partially exploded perspective view of the seats of FIG. 1 with the pneumatic cushion positioned on the seat pan.

Referring now to FIGS. 2, 3 and 4, the pneumatic cushion 120 is described in further detail. The pneumatic cushion 120 includes a bladder 130 fabricated of flexible laminated plastic sheeting of a type used on aircraft and that is capable of passing a required vertical burn test. In one preferred embodiment, the bladder 130 includes two separate pneumatic chambers 132, 134, each provided with a pneumatic port 136, 138. The chambers 132, 134 are defined by a panel 140 of a predetermined height secured into the bladder 130, for example, by a sonic-welded continuous seam. As shown in FIG. 3, the pneumatic cushion 120, when inflated, has a relatively large height on the forward end, shown on the right in FIG. 3, that tapers to a small height on the rearward end. The overall shape of the pneumatic cushion 120 is triangular, as shown in FIG. 5. In the embodiment of FIGS. 2, 3 and 4 the inflation of the cushion 120 can be varied by varying the inflation of the chambers 132 and 134 relative to each other.

Figure 6:
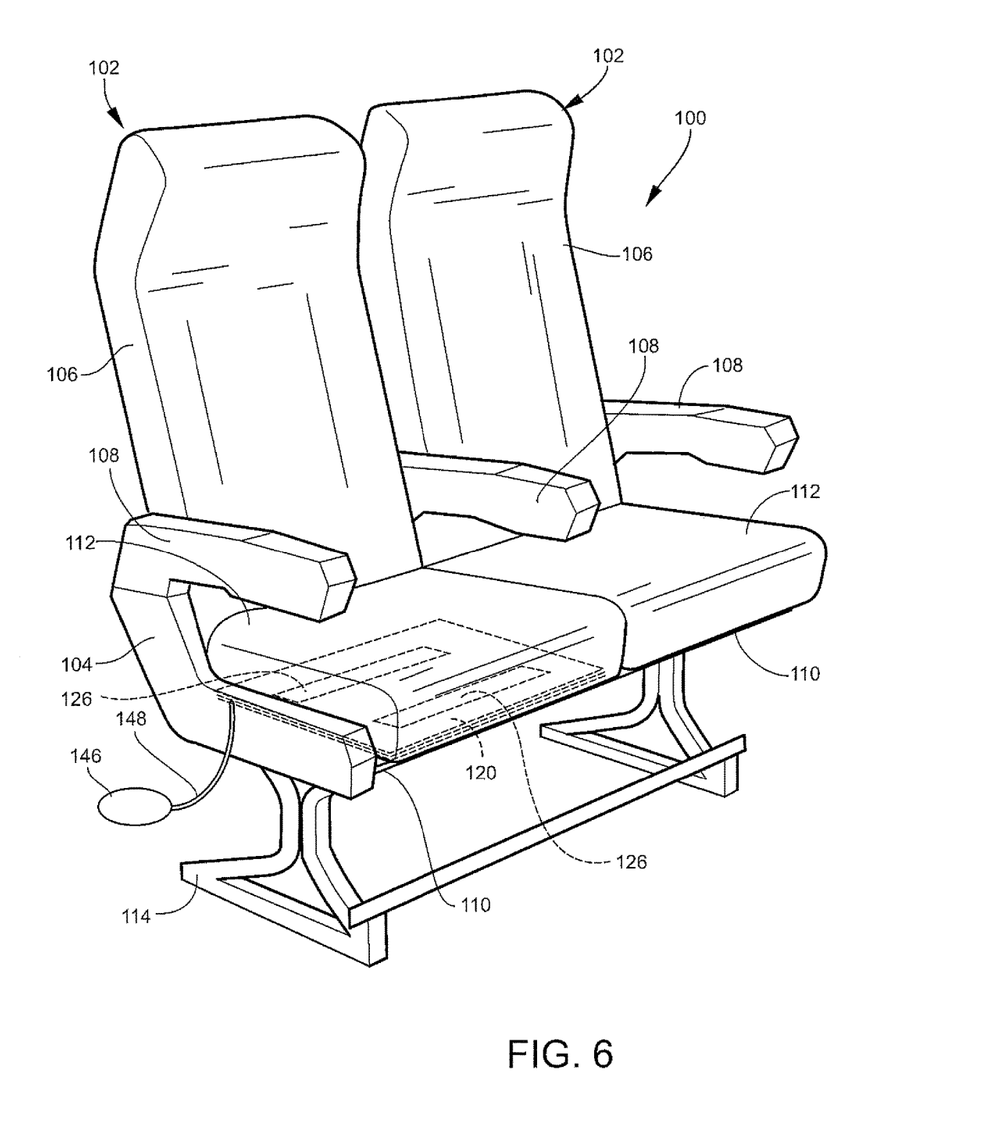
FIG. 6 is a perspective view of the seats of FIG. 1 with the pneumatic cushion installed over the seat pan and under the foam seat bottom cushion.
Figure 7:
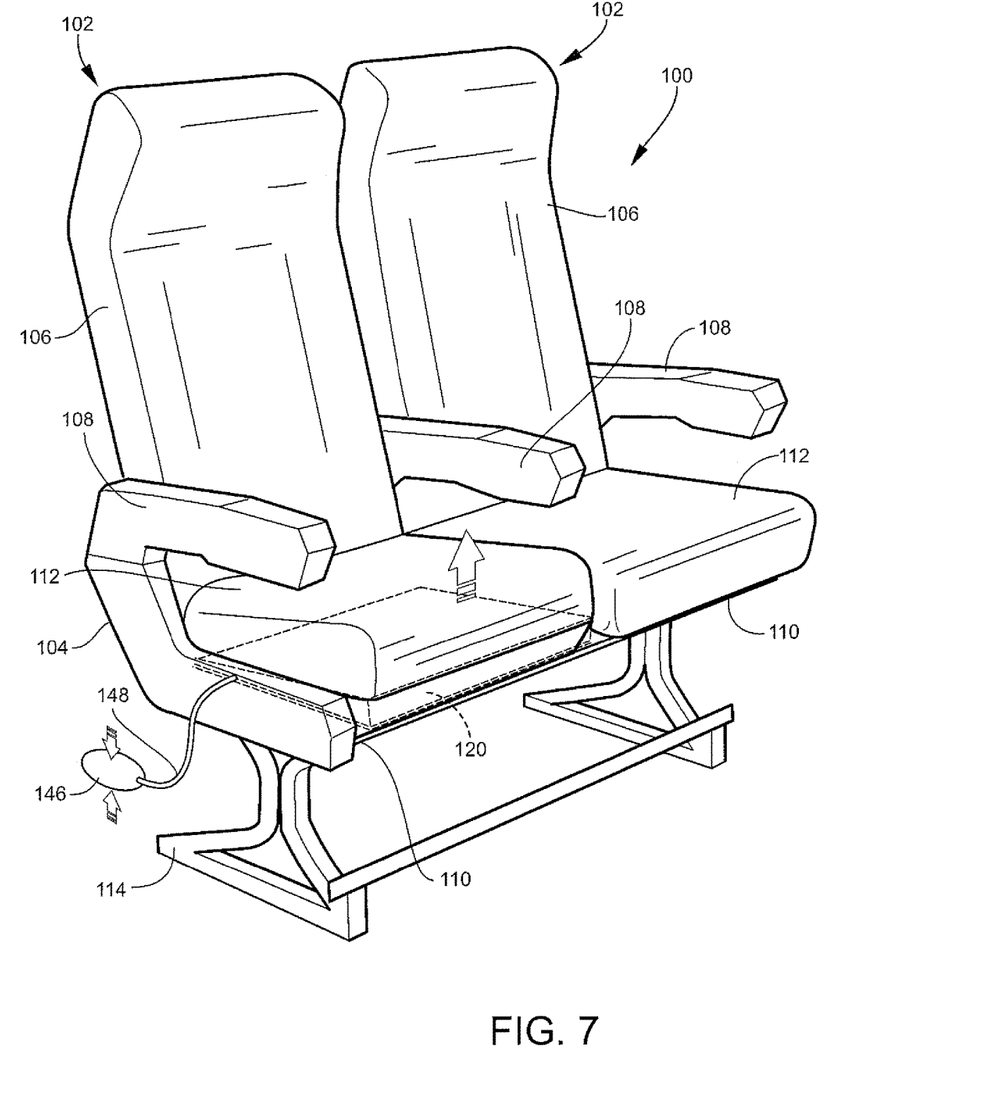
FIG. 7 is a perspective view of the seats of FIG. 1 illustrating that activation of the inflation device articulates the forward end of the pneumatic cushion upwardly.

Further illustration of the position of the pneumatic cushion 120 in relation the seat 102 and particularly the seat pan 110 and foam cushion 112 is shown in FIGS. 5, 6 and 7. The degree of inflation permits the seat occupant to articulate the front of the foam cushion 112 up to provide greater comfort, particularly when the seat back 106 is reclined, as shown in FIG. 7.

Figure 8:
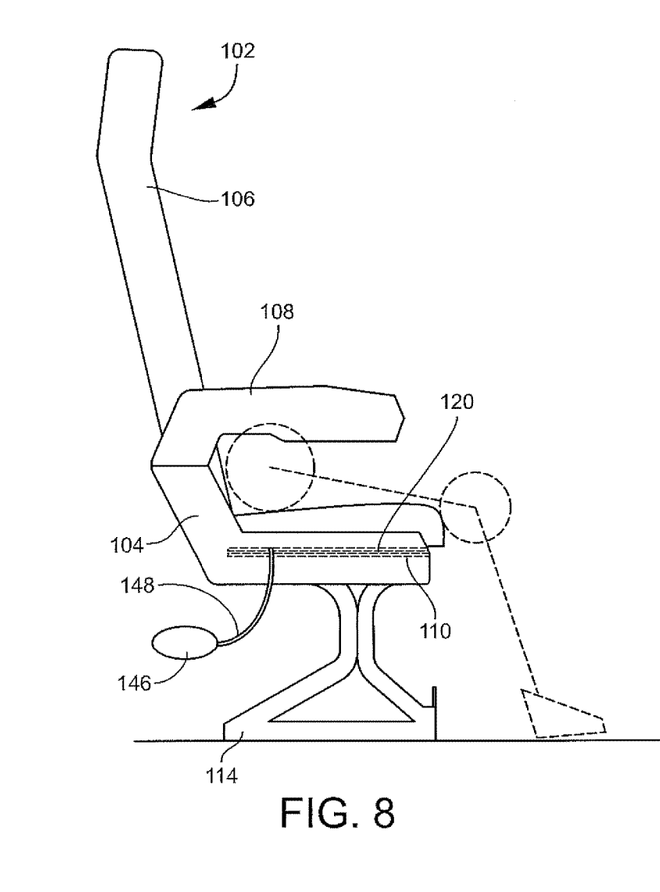
FIGS. 8 and 9 are side elevation views showing the articulation of the pneumatic cushion when inflated in two different positions.
Figure 9:
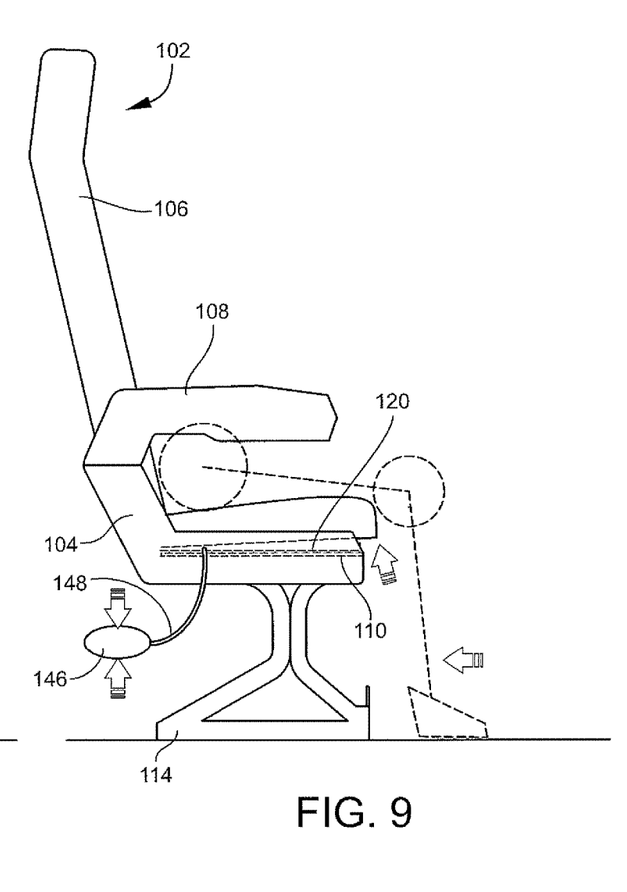

When deflated, the pneumatic cushion 120 assumes a relatively flat configuration as shown in FIG. 8. FIGS. 8 and 9 illustrate the articulation of the pneumatic cushion 120 as it moves from a deflated, FIG. 8, to an inflated position, FIG. 9.

Inflation and deflation may be achieved manually by the seat occupant or flight attendant during flight by use of a squeezable bulb 146 connected to the pneumatic cushion by a hose 148, as shown in FIGS. 1, 5, 6, 7, 8 and 9. Embodiments of the cushion having more than one chamber are provided with a pneumatic port for each chamber. The bulb 146 is shown in the illustrated position for clarity, but in use will likely be positioned in or near the armrest 108 or next to the outboard side of the foam cushion 112, and in instances where there is more than one chamber, a bulb 146 or some other actuator for each chamber.

As is well-known, aircraft cabin pressure while on the ground is maintained at atmospheric pressure by an open valve, known as a "dump valve", which closes when the aircraft takes off and begins its ascent. Air pressure inside the aircraft reduces as the aircraft gains altitude but at a much lower rate than the rate of climb of the aircraft. At typical passenger aircraft cruising altitudes in the range 36,000 to 40,000 ft. (11,000-12,200 m), air pressure in the aircraft cabin is equivalent to outside air pressure at 6,000-8,000 ft. (1,800-2,400 m) above sea level. For this reason, the pneumatic cushion 120, containing a specific air pressure at ground level, will begin to inflate as the aircraft climbs due to the differential between the pressure in the pneumatic cushion 120 and the cabin altitude. In the embodiment described above showing the manually operable squeeze bulb 146, the seat occupant can add or release air by manipulating the bulb 146 from time-to-time to maintain the desired seating position. A bleed valve, not shown, can bleed air as necessary without seat occupant intervention.

Figure 10:
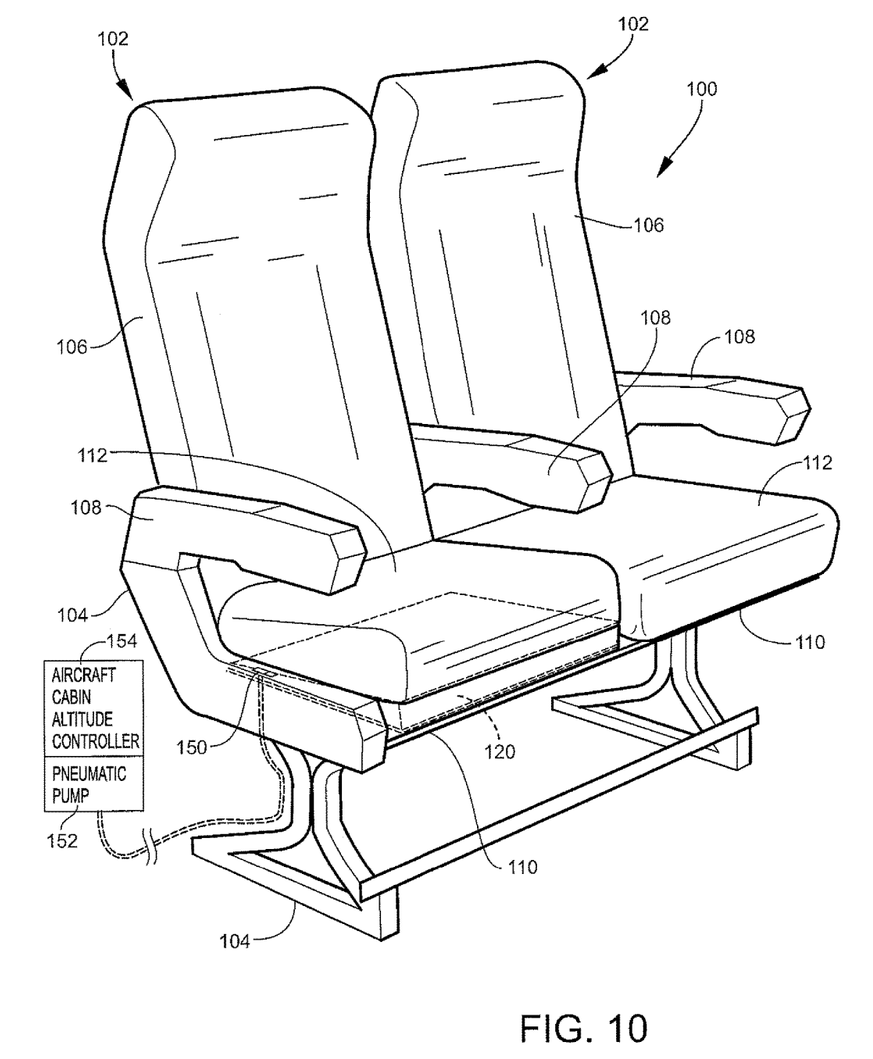
FIG. 10 is a perspective view of a pair of main cabin seats connected to an aircraft cabin altitude controller and pneumatic pump controlled by the altitude controller to vary the inflation of the pneumatic cushion responsive to the cabin altitude.

Alternatively, as shown in FIG. 10, the inflation and deflation of the pneumatic cushion 120 can be accomplished in the first instance by the seat occupant by operating a switch 150 located in a convenient location connected to a pneumatic pump 152 controlled by the aircraft's cabin altitude controller 154. Thereafter, as the aircraft ascends or descends, the cabin altitude controller 154 can automatically maintain the desired pressure in the pneumatic cushion 120 by bleeding air from or pumping air into the pneumatic cushion 120, as needed. Typical pressure value is 3 psi (20.7 kPa).

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

I claim:

1. A passenger seat, comprising:
    a seat frame including a seat back and at least one armrest;
    a seat bottom that includes a seat pan and a foam seat cushion positioned on the seat bottom above the seat pan;
    a pneumatic cushion positioned on the seat bottom between the seat pan and the foam seat cushion and adapted to maintain a predetermined level of inflation determined by air pressure within the pneumatic cushion; and
    a pneumatic inflation device communicating with the pneumatic cushion for permitting the air pressure within the pneumatic cushion to be varied as desired to alter the angle of the seat bottom in relation to the seat back, the inflation device including a pneumatic pump connectable to an aircraft cabin altitude controller for controlling the air pressure within the pneumatic cushion.

2. A passenger seat according to claim 1, the pneumatic cushion including at least first and second laterally-separated cushion chambers providing lateral articulation of the first and second cushion chambers relative to each other.

3. A passenger seat according to claim 1, the inflation device including a manual hand pump operable by the seat occupant to control the air pressure within the pneumatic cushion.

4. A passenger seat according to claim 1, and including a mechanical attachment carried by the seat pan for securing the pneumatic cushion to the seat pan.

5. A passenger seat according to claim 1, and including a mechanical attachment carried by the foam cushion for securing the pneumatic cushion to the foam cushion.

6. A passenger seat according to claim 1, and including a mechanical attachment carried by the seat pan for securing the pneumatic cushion to the seat pan and a mechanical attachment carried by the foam cushion for securing the pneumatic cushion to the foam cushion.

7. A passenger seat according to claim 1, and including a mechanical attachment carried by the foam cushion for securing the pneumatic cushion to the foam cushion.

8. A passenger seat according to claim 1, and including a first pair of complimentary touch fastener elements carried by the foam cushion and pneumatic cushion, respectively, for securing the foam cushion to the pneumatic cushion, and a second pair of complimentary touch fastener elements carried by the seat pan and the pneumatic cushion, respectively, for securing the pneumatic cushion to the seat pan.

9. A passenger seat according to claim 8, wherein the touch fastener elements comprise complimentary hook and loop elements.

10. A passenger seat according to claim 1, wherein the pneumatic cushion has a shape that has a forward end with a greater height than a rearward end of the pneumatic cushion.

11. A passenger seat according to claim 1, wherein in side elevation the pneumatic cushion defines an elongate triangle having a base positioned at a forward end of the seat pan.

12. An aircraft passenger seat, comprising:
    a seat base for being attached to a deck of the aircraft;
    a seat frame carried by the seat base and including a seat back, a seat bottom, and at least one armrest carried by the seat frame;
    a foam seat bottom cushion positioned on the seat bottom and a foam seat back cushion positioned on the seat back;
    a pneumatic cushion positioned between at least one of the seat bottom and the foam seat bottom cushion and the seat back and the foam seat back cushion and adapted to maintain a predetermined level of inflation determined by air pressure within the pneumatic cushion;
    a pneumatic inflation device communicating with the pneumatic cushion for permitting the air pressure within the pneumatic cushion to be varied as desired alter the angle of the seat bottom in relation to the seat back to provide additional comfort to the seat occupant; and
    a mechanical attachment comprising complimentary touch fastener elements for securing the pneumatic cushion to the at least one foam seat bottom and the foam seat back.

13. A passenger seat according to claim 12, the pneumatic cushion including at least first and second laterally-separated cushion chambers providing lateral articulation of the first and second cushion chambers relative to each other.

14. A passenger seat according to claim 12, each of the first and second laterally-separated cushion chambers provided with a separate pneumatic inflation port for permitting individual inflation of the first and second cushion chambers.

15. A passenger seat according to claim 12, the inflation device including a pneumatic pump adapted for connection to an aircraft cabin altitude controller for controlling the air pressure within the pneumatic cushion.

16. A passenger seat according to claim 12, wherein the touch fastener elements comprise complimentary hook and loop elements.

17. A passenger seat according to claim 12, wherein the pneumatic cushion has a shape that has a forward end with a greater height dimension than a rearward end of the pneumatic cushion and is adapted to alter the angle of the seat bottom in relation to the seat back to elevate a seat occupant's upper leg in relation to the seat occupant's thigh.

18. A passenger seat according to claim 12, wherein in side elevation the pneumatic cushion defines an elongate triangle having a base positioned at a forward end of the seat pan.

* * * * *